July 6, 1926.
J. R. MERRIFIELD
1,591,719
COMBINATION TRUCK AND CONVEYER
Filed July 8, 1925
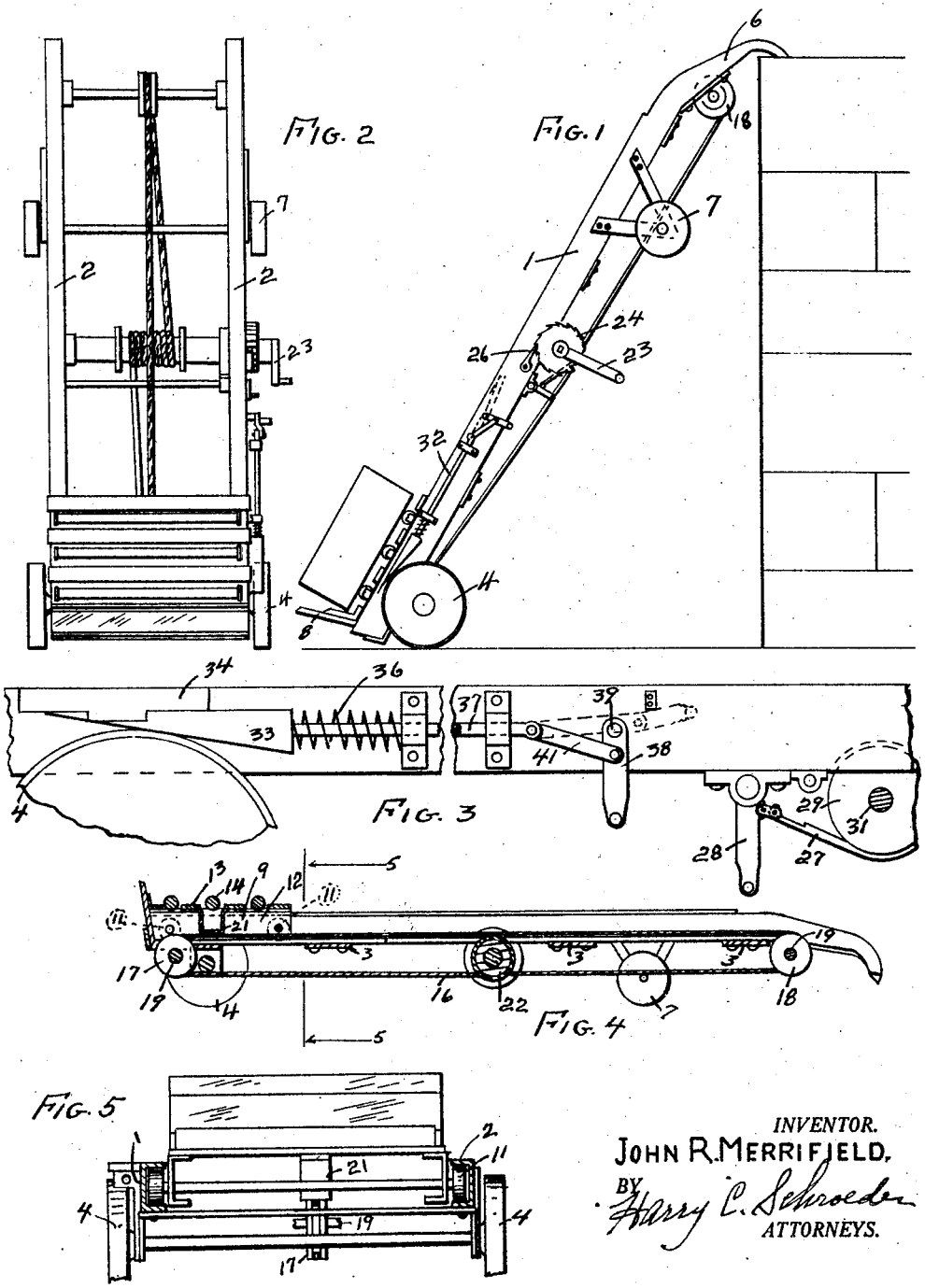
INVENTOR.
JOHN R. MERRIFIELD,
BY
Harry C. Schroeder
ATTORNEYS.

Patented July 6, 1926.

1,591,719

UNITED STATES PATENT OFFICE.

JOHN R. MERRIFIELD, OF OAKLAND, CALIFORNIA, ASSIGNOR OF TWENTY-FOUR AND ONE-HALF PER CENT TO GEORGE A. MARSHALL AND TWENTY-FOUR AND ONE-HALF PER CENT TO W. A. WILSON, BOTH OF OAKLAND, CALIFORNIA.

COMBINATION TRUCK AND CONVEYER.

Application filed July 8, 1925. Serial No. 42,163.

The present invention relates to improvement in a combination truck and conveyer and has particular reference to the well-known hand truck commonly used for moving and stacking heavy boxes and packages. It is proposed in the present invention to combine with this hand truck improved means for allowing a box disposed on the truck to be raised to a platform or on top of a stack of boxes by placing the curved handle normally provided in a hand truck on top of the platform or the stack of boxes and providing a carriage riding on the truck in combination with means for elevating the carriage and for causing the same to tilt when reaching the top of the stack so as to automatically discharge the box at the desired place. In this connection it is desired to utilized features of a stacking device described in my co-pending application, Serial No. 39,453.

Further objects and advantages of my device will appear as the specification proceeds.

The prefered form of my invention is illustrated in the accompanying drawing in which Figure 1 shows a side view of my device, Figure 2 a front view of the same as seen when the device is arranged relative to a stack of boxes, Figure 3 an enlarged detail view in side elevation of an intermediate portion of my device, Figure 4 a longitudinal section through the same and Figure 5 a transverse section taken along line 5—5 of Figure 4.

While I have shown only the preferred form of my invention, it should be understood that various changes or modifications may be made within the scope of the claims hereto attached without departing from the spirit of the invention.

My truck 1 is similar in many ways to the ordinary hand truck now commonly used and consists of two channel irons 2, the flanges of which face one another and which are kept in spaced relation by means of a plurality of transverse spacing members 3. One end of the same thus formed is supported on wheels 4 while at the other end the channel irons terminate in a curve 6 characteristic of hand trucks and allowing the said end to be placed on a stack or platform in the manner shown in Figure 1. Additional wheels 7 may be provided near the operating end of the truck in the manner shown in Figure 1. Where the channel irons begin to turn into the curve 6 the upper flange is cut away for purposes which will appear hereinafter. At the lower end of the same there is provided a brace 8 forming a stop for the carriage 9 which latter is provided with wheels 11 on either side adapted to ride in the channel irons. The carriage is very simple in construction and comprises lateral frame members 12, transverse frame members 13 and rollers 14 supported between the transverse frame members so as to project above the same and to allow the box or other load to be placed thereon.

An endless cable 16 is supported underneath the truck on two pulleys 17 and 18 arranged on transverse shafts 19 in the rear and front ends of the truck respectively. The upper strand of the cable is secured to the carriage as shown at 21 and the lower strand is wound on an operating drum 22 disposed at any suitable place between the two pulleys and adapted to be manipulated by means of a crank handle 23 disposed on the side of the truck. A ratchet wheel 24 fixed relative to the drum co-operates with a pawl 26 and automatically locks the drum against reverse motion. A suitable brake mechanism 27 operated by the handle 28 and working on a disc 29 fixed relative to the drum shaft 31 may be used to control the downward motion of the carriage when the pawl 26 is disengaged from its ratchet.

To prevent the truck from slipping when placed in the position shown in Figure 1 a second brake mechanism 32 is associated with the wheels 4. This brake mechanism comprises a wedge 33 adapted to be forced between one of the wheels 4 and a fixed member 34 projecting laterally from the truck over the wheels 4. A spring 36 encircling a handle 37 for the wedge tends to render the same operative while the wedge may be withdrawn from an operative position by means of a lever handle 38 pivoted to the truck frame as at 39 and acting on the wedge handle 37 through a link 41, the pivot 39 being arranged substantially in alignment with the wedge handle 37 so that when the lever handle 38 is thrown backward it is automatically locked in such position.

The operation of the device will be readily understood from the foregoing description. the truck may be used like any other ordinary hand truck for moving boxes or other heavy packages from place to place. If it is desired to stack the boxes they may be successively placed on the carriage 9 and the handle of the truck placed on top of the stack in the manner shown in Figure 1, whereupon the carriage may be raised by revolving the drum 22. After the carriage has reached the top of the truck it will follow the path of the curved handle and automatically tilt into the plane of the upper box on the stack. When the cable reaches the extreme end of its travel, it will stop the truck and if its stop is effected somewhat suddenly the box will automatically roll on the stack by its own gravity. To return the carriage it is only necessary to lift the pawl 26 and to start the carriage on its downward travel by reversing the revolving motion of the drum. Too much speed may be checked by means of a brake mechanism 27. The truck itself is held against slipping by releasing the brake mechanism of the wedge 33.

Having described my invention, what I claim is:—

1. In combination, a hand truck comprising a frame, a wheel support at one end thereof and curved handles at the other end, a carriage slidable on the frame, and mechanical means for elevating the carriage when the handles are raised to rest on a platform, the curved handles allowing the carriage to tilt into the plane of the platform when reaching the top of the truck and the wheels being disposed to remain active as support for the truck frame while the handles are raised to rest on the platform.

2. In combination, a hand truck comprising a frame, a wheel support at one end thereof and curved handles at the other end, a carriage slidable on the frame, pulleys arranged in the frame near the ends thereof, a central pulley in the frame, and a cable passing over the end pulleys and wound on the central pulley, the cable being secured to the bottom of the carriage for elevating the same when the central pulley is revolved and the wheels being disposed near the extreme end of the frame so as to remain active as support for the truck frame while the handles are raised to rest on a platform.

3. In combination, a hand truck comprising a frame, a wheel support at one end thereof, and curved handles at the other end, a carriage slidable on the frame, mechanical means for lifting the carriage when the handles are raised to rest on a platform, the curved handles allowing the carriage to tilt into the plane of the platform when reaching the top of the truck and the wheels being disposed to remain active as support for the truck frame while the handles are raised to rest on the platform, and a brake for the wheel having an operating element arranged on the side of the truck and made to become active automatically upon release of the operating element.

4. In combination, a hand truck comprising a frame, curved handles at one end thereof adapted to be placed on a platform when raised, a wheel support for the other end arranged to remain active as support for the frame when the other end is raised and a brake for the wheel with operating means for the same, a carriage slidable on the frame and means for elevating the carriage on the truck when the handles are raised including a revolving crank, the latter crank and the brake operating means being placed in close proximity.

In testimony whereof I affix my signature.

JOHN R. MERRIFIELD.